(12) United States Patent
Jeong et al.

(10) Patent No.: US 11,909,296 B2
(45) Date of Patent: Feb. 20, 2024

(54) MAGNETIC BEARING AND COMPRESSOR HAVING THE SAME

(71) Applicant: LG ELECTRONICS INC., Seoul (KR)

(72) Inventors: Sena Jeong, Seoul (KR); Kiwook Lee, Seoul (KR); Seongki Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 297 days.

(21) Appl. No.: 17/223,699

(22) Filed: Apr. 6, 2021

(65) Prior Publication Data
US 2021/0320560 A1 Oct. 14, 2021

(30) Foreign Application Priority Data

Apr. 9, 2020 (KR) .......................... 10-2020-0043453

(51) Int. Cl.
*H02K 7/09* (2006.01)
*H02K 5/22* (2006.01)
*H02K 3/52* (2006.01)

(52) U.S. Cl.
CPC .............. *H02K 7/09* (2013.01); *H02K 3/522* (2013.01); *H02K 5/22* (2013.01); *H02K 2203/12* (2013.01)

(58) Field of Classification Search
CPC ............ H02K 7/09; H02K 3/522; H02K 5/22; H02K 2203/12; H02K 7/14; F05D 2270/334; F25B 2339/047; F25B 2500/13; F25B 1/04; F25B 49/025; F25B 31/006; F04D 17/10; F04D 29/051; F04D 29/058; F04D 27/02; F04D 29/582; F04D 25/062; F04D 25/0646; F16C 32/0444; F16C 32/0489; F16C 2362/52; F16C 32/0461; F16C 32/047; F16C 32/048; F16C 32/044; F16C 2360/44
USPC ....................................... 310/214, 215, 90.5
See application file for complete search history.

(56) References Cited

U.S. PATENT DOCUMENTS

| 5,331,246 | A | * | 7/1994 | Baronosky | ............. | H02K 3/522 310/194 |
| 5,998,899 | A | | 12/1999 | Rosen et al. | | |
| 2004/0245878 | A1 | * | 12/2004 | Kim | ...................... | H02K 29/08 310/114 |
| 2012/0187797 | A1 | * | 7/2012 | Van Tiem | ............... | H02K 3/325 310/215 |
| 2013/0154437 | A1 | * | 6/2013 | Kaiser | ...................... | H02K 1/30 310/216.114 |

(Continued)

FOREIGN PATENT DOCUMENTS

| CN | 205207432 U | 5/2016 |
| CN | 205278108 U | 6/2016 |

(Continued)

*Primary Examiner* — Ahmed Elnakib
(74) *Attorney, Agent, or Firm* — Birch, Stewart, Kolasch & Birch, LLP

(57) ABSTRACT

A magnetic bearing is provided. The magnetic according to the present disclosure includes: a stator core disposed to surround a central axis; a plurality of bobbins coupled to the stator core; a coil wound around the bobbin; and a positioning member coupled to the plurality of bobbins and determining positions of the plurality of bobbins, and the positioning member has a circular shape centered on a central point.

20 Claims, 12 Drawing Sheets

(56) References Cited

U.S. PATENT DOCUMENTS

2015/0233422 A1* 8/2015 Irino .................. F16C 32/0461
                      310/90.5
2019/0103782 A1* 4/2019 Imaizumi ................ H02K 3/18
2021/0320560 A1* 10/2021 Jeong .................. F16C 32/0461

FOREIGN PATENT DOCUMENTS

| CN | 110829668 A | | 2/2020 |
|----|-------------|---|--------|
| CN | 110966055 A | | 4/2020 |
| JP | 2015006016 | * | 1/2015 |
| WO | WO 2016/174894 A1 | | 11/2016 |

* cited by examiner

MAGNETIC BEARING AND COMPRESSOR HAVING THE SAME

CROSS-REFERENCE TO RELATED APPLICATION

This application claims the benefit of priority to Korean Patent Application No. 10-2020-0043453, filed on Apr. 9, 2020 in the Korean Intellectual Property Office, the disclosure of which is incorporated herein by reference in its entirety.

BACKGROUND

Technical Field

The present disclosure relates to a magnetic bearing.

Background Information

In general, a chiller system supplies cold water to a cold water demand place, and is characterized in that heat exchange is performed between refrigerant circulating in a refrigeration system and cold water circulating between the cold water demand place and the refrigeration system to cool the cold water. Such the chiller system is a large-capacity facility and may be installed in a large-scale building.

A compressor for compressing a refrigerant is used in the chiller system, and in such the compressor, a magnetic bearing device that supports a rotation body in a non-contact manner is widely used as a bearing device (see, for example, Patent Document 1).

The magnetic bearing device is generally configured to support a load of the rotation body in the non-contact manner by attracting a target, installed on the rotation body by a plurality of electromagnets installed around the rotation body. Therefore, if the electromagnets do not attract the target of the rotation body with an appropriate attraction force (magnetic force), there is a fear that a precision of the bearing may decrease.

The Patent Document 1 has been disclosed a structure in which a rotor shaft is attached to a center of the rotation body having rotating blades, and an annular electromagnet is disposed outside a radial direction of the rotor shaft, and the rotor shaft is suspended in the air by the annular electromagnet.

In the prior art, it is difficult to accurately match a concentricity of a plurality of coils, and there is a problem that the concentricity of the plurality of coils decreases during operation of the compressor. When the concentricity of the plurality of coils decreases, it becomes difficult to cause the rotation body to float and rotate at an accurate position, and there is a problem that the magnetic bearing is damaged due to friction between the rotation body and the magnetic bearing.

(Patent Document 0001) Japanese Patent Publication No. 2006-83923.

SUMMARY

It is an object of the present disclosure to provide a magnetic bearing that minimizes a volume of a bobbin and secures a winding space of a coil.

It is another object of the present disclosure to provide a magnetic bearing that improves a concentricity of a plurality of bobbins and coils and improves a control accuracy of a magnetic bearing.

It is another object of the present disclosure to provide a magnetic bearing for fixing a plurality of bobbins through a structure that has low manufacturing cost and is easy to manufacture.

It is another object of the present disclosure to prevent damage to a compressor by controlling a magnetic bearing when a surge generated in the compressor occurs.

In order to achieve the above object, a magnetic bearing according to an embodiment of the present disclosure is characterized in that it includes a positioning member which is coupled to a plurality of bobbins disposed to surround a central axis and determines positions of the plurality of bobbins by a shape coupled to the bobbins.

In accordance with an aspect of the present disclosure, the above and other objects can be accomplished by providing a magnetic bearing, including: a stator core disposed to surround a central axis; a plurality of bobbins coupled to the stator core; a coil wound around the bobbin; and a positioning member coupled to the plurality of bobbins and determining positions of the plurality of bobbins, and the positioning member has a circular shape centered on a central point.

According to another aspect of the present disclosure, a magnetic bearing including: a stator core disposed to surround a central axis; a plurality of bobbins coupled to the stator core; a coil wound around the bobbin; and a positioning member coupled to the plurality of bobbins and determining positions of the plurality of bobbins, and the bobbin includes a coupling groove into which the positioning member is inserted, and the coupling groove is an arc-shaped.

According to another aspect of the present disclosure, the central point of the positioning member is positioned on the central axis of the stator core.

According to another aspect of the present disclosure, the bobbin includes: a coil coupling part on which the coil is wound; and a holder including a coupling groove into which the positioning member is inserted and a fastening groove formed in the coupling groove and to which a fastening member is fastened.

According to another aspect of the present disclosure, the coupling groove forms an arc having a radius equal to a radius of the positioning member.

According to another aspect of the present disclosure, the coil coupling part includes: a body on which the coil is wound; a first flange connected to one end of the body in a thickness direction and having a width greater than a width of the body; and a second flange connected to the other end of the body in the thickness direction and having a width greater than the width of the body.

According to another aspect of the present disclosure, the holder is connected to the second flange.

According to another aspect of the present disclosure, the holder is positioned farther from the central axis than the coil coupling part.

According to another aspect of the present disclosure, the positioning member includes a plurality of coupling holes through which a fastening member passes.

According to another aspect of the present disclosure, two of the plurality of coupling holes form a set, and a pitch between adjacent sets is constant.

According to another aspect of the present disclosure, separation distances of the plurality of bobbins from the central axis are equal to each other.

According to another aspect of the present disclosure, separation distances between the bobbins adjacent to each other are constant.

According to another aspect of the present disclosure, the magnetic bearing further includes a plurality of teeth protruding toward a center of the stator core from an inner circumferential surface of the stator core, and the bobbin includes: a plurality of first bobbins coupled to a front end of each of the teeth; and a plurality of second bobbins coupled to a rear end of each tooth.

According to another aspect of the present disclosure, the positioning member includes: a first positioning member coupled to the plurality of first bobbins; and a second positioning member coupled to the plurality of second bobbins.

According to another aspect of the present disclosure, the first positioning member is positioned in front of the stator core, and the second positioning member is positioned behind the stator core.

According to another aspect of the present disclosure, an extension line of the body in the thickness direction meets the central point.

In accordance with another aspect of the present disclosure, the above and other objects can be accomplished by providing a compressor, including the above-described magnetic bearing.

DETAILED DESCRIPTION

Figure 1:
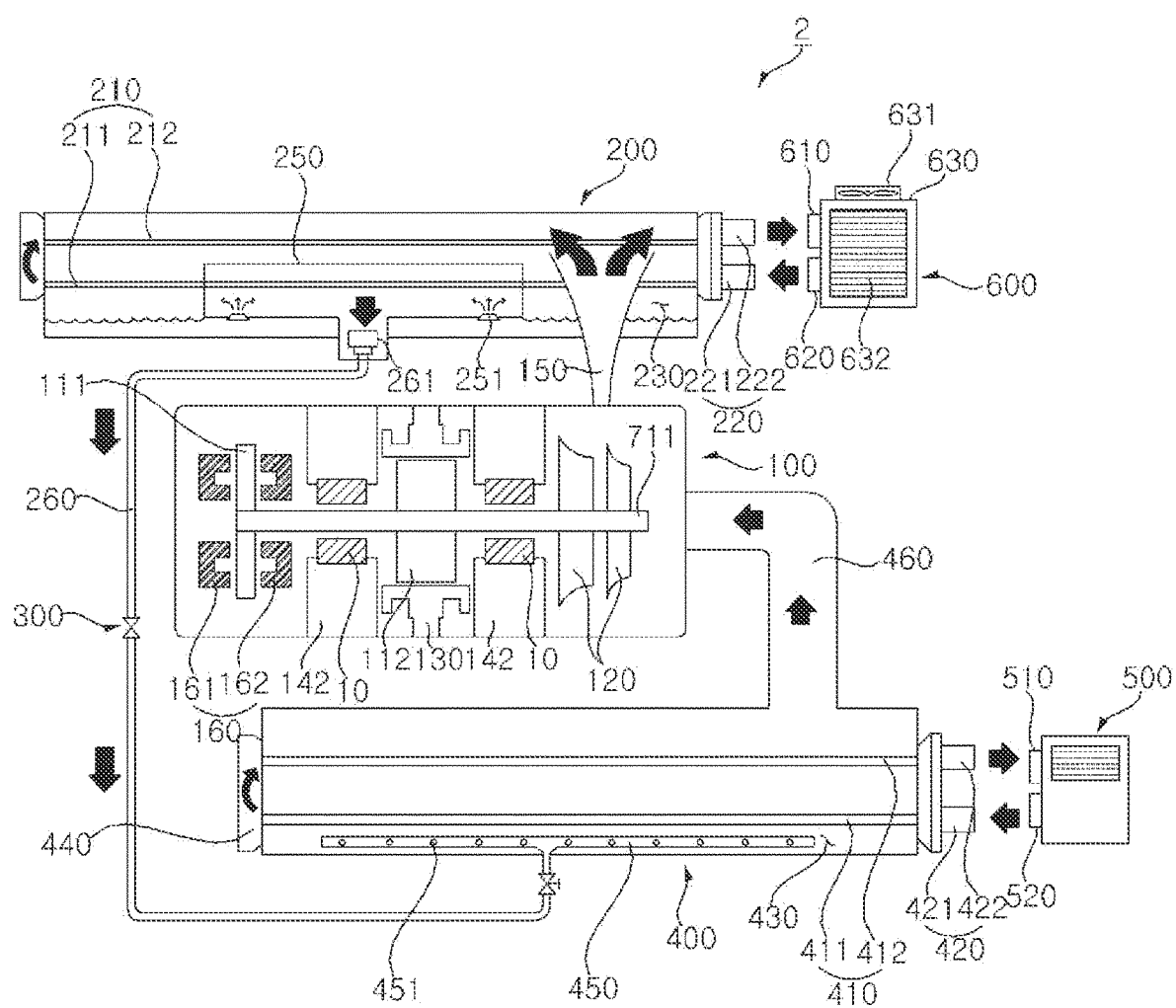
FIG. 1 is a view showing a chiller system according to an embodiment of the present disclosure.

Advantages and features of the present disclosure and methods for achieving those of the present disclosure will become apparent upon referring to embodiments described later in detail with reference to the attached drawings. However, embodiments are not limited to the embodiments disclosed hereinafter and may be embodied in different ways. The embodiments are provided for perfection of disclosure and for informing persons skilled in this field of art of the scope of the present disclosure. The same reference numerals may refer to the same elements throughout the specification.

Spatially-relative terms such as "below", "beneath", "lower", "above", or "upper" may be used herein to describe one element's relationship to another element as illustrated in the Figures. It will be understood that spatially-relative terms are intended to encompass different orientations of the device in addition to the orientation depicted in the Figures. For example, if the device in one of the figures is turned over, elements described as "below" or "beneath" ether elements would then be oriented "above" the other elements. The exemplary terms "below" or "beneath" can, therefore, encompass both an orientation of above and below. Since the device may be oriented in another direction, the spatially-relative terms may be interpreted in accordance with the orientation of the device.

The terminology used in the present disclosure is for the purpose of describing particular embodiments only and is not intended to limit the disclosure. As used in the disclosure and the appended claims, the singular forms "a", "an" and "the" are intended to include the plural forms as well, unless context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, the thickness or size of each layer is exaggerated, omitted, or schematically illustrated for convenience of description and clarity. Also, the size or area of each constituent element does not entirely reflect the actual size thereof.

Hereinafter, exemplary embodiments of the present disclosure will be described with reference to the accompanying drawings.

FIG. 1 is a view showing a chiller system having a compressor 100 of the present disclosure. Meanwhile, the compressor 100 according to an embodiment of the present disclosure not only function as a part of the chiller system but also may be included in an air conditioner, and the compressor 100 may be included in any device for compressing gaseous substances.

FIG. 1, a chiller system 1 according to an embodiment of the present disclosure includes a compressor 100 formed to compress a refrigerant, a condenser 200 for condensing the refrigerant by heat exchange between the refrigerant compressed in the compressor 100 and cooling water, an expander 300 to expand the refrigerant condensed in the condenser 200, and an evaporator 400 formed to cool cold water and to evaporate the refrigerant by heat exchange between the refrigerant and cold water expanded in the expander 300.

In addition, the chiller system 1 according to an embodiment of the present disclosure further includes a cooling water unit 600 that heats the cooling water through heat exchange between the refrigerant condensed in the condenser 200 and the cooling water, and an air conditioning unit 500 that cools cold water through heat exchange between the refrigerant expanded in the evaporator 400 and cold water.

The condenser 200 provides a place for heat exchange between high-pressure refrigerant compressed by the compressor 100 and cooling water introduced from the cooling water unit 600. The high-pressure refrigerant is condensed through heat exchange with cooling water.

The condenser 200 may be configured as a shell-tube type heat exchanger. Specifically, the high-pressure refrigerant compressed by the compressor 100 is introduced into a condensation space 230 corresponding to an internal space of the condenser 200 through a discharge passage 150. In addition, the condensation space 230 includes a cooling water passage 210 through which cooling water introduced from the cooling water unit 600 can flow.

The cooling water passage 210 is composed of a cooling water inlet passage 211 through which cooling water is introduced from the cooling water unit 600 and a cooling water discharge passage 212 through which cooling water is discharged to the cooling water unit 600. The cooling water heat-exchanges with the refrigerant in the condensation space 230 and then is introduced into the cooling water discharge passage 212 through a cooling water connection passage provided inside or outside the condenser 200.

The cooling water unit 600 and the condenser 200 are connected via a cooling water tube 220. The cooling water tube 220 may be formed of a material such as rubber so that the cooling water flows between the cooling water unit 600 and the condenser 200 as well as to prevent leakage to the outside.

The cooling water tube 220 is composed of a cooling water inlet tube 221 connected to the cooling water inlet passage 211 and a cooling water discharge tube 222 connected to the cooling water discharge passage 212. Looking at the flow of the cooling water as a whole, the cooling water that has completed heat exchange with air or liquid in the cooling water unit 600 flows into the condenser 200 through the cooling water inlet tube 221. The cooling water introduced into the condenser 200 passes through the cooling water inlet passage 211, the cooling water connection passage 240, and the cooling water discharge passage 212 provided in the condenser 200 in order, exchanges heat with the refrigerant introduced into the condenser 200, and then passes through the cooling water discharge tube 222 and is introduced into the cooling water unit 600 again.

Meanwhile, the cooling water absorbing heat of the refrigerant through heat exchange in the condenser 200 may be air-cooled in the cooling water unit 600. The cooling water unit 600 is composed of a main body 630, a cooling water inlet pipe 610 that is an inlet through which the cooling water absorbing heat is introduced through the cooling water discharge tube 222, and a cooling water discharge pipe 620 that is an outlet through which the cooling water is discharged after being cooled inside the cooling water unit 600.

The cooling water unit 600 may use air to cool the cooling water introduced into the main body 630. Specifically, the main body 630 is composed of an air outlet 631 through which a fan for generating air flow is provided, and an air inlet 632 corresponding to an inlet through which air is introduced into the main body 630.

Air discharged after heat exchange at the air discharge port 631 may be used for heating. Refrigerant that has been heat-exchanged in the condenser 200 is condensed and accumulated under the condensation space 230. Accumulated refrigerant is introduced into the expander 300 after introduced into a refrigerant box 250 provided in the condensation space 230.

Accumulated refrigerant is introduced into the refrigerant inlet 251, and introduced refrigerant is discharged into an evaporator connection passage 260. The evaporator connection passage 260 includes an evaporator connection passage inlet 261, and the evaporator connection passage inlet 261 may be positioned in a lower part of the refrigerant box 250.

The evaporator 400 includes an evaporation space 430 in which heat exchange occurs between the refrigerant expanded in the expander 300 and cold water. Refrigerant that has passed through the expander 300 in the evaporator connection passage 260 is introduced into a refrigerant injection device 450 provided in the evaporator 400, passes through a refrigerant injection hole 451 provided in the refrigerant injection device 450, and spreads evenly into the evaporator 400.

In addition, a cold water passage 410 is provided inside the evaporator 400, and the cold water passage 410 includes a cold water inlet passage 411 through which cold water is introduced into the evaporator 400 and a cold water discharge passage 412 through which cold water is discharged to an outside of the evaporator 400.

Cold water is introduced or discharged through a cold water tube 420 communicating with the air conditioning unit 500 provided outside the evaporator 400. The cold water tube 420 is composed of a cold water inlet tube 421 that is a passage through which cold water inside the air conditioning unit 500 flows into the evaporator 400 and a cold water discharge tube 422 that is a passage through which cold water that has been heat-exchanged in the evaporator 400 is discharged to the air conditioning unit 500. That is, the cold water inlet tube 421 is in communication with the cold water inlet passage 411 and the cold water discharge tube 422 is in communication with the cold water outlet passage 412.

Looking at a flow of cold water, cold water passes through the air conditioning unit 500, the cold water inlet tube 421 and the cold water inlet passage 411, and passes through an inner end of the evaporator 400 or the cold water connection passage 440 provided outside the evaporator 400 after, and is introduced into the air conditioning unit 500 through the cold water discharge passage 412 and the cold water discharge tube 422 again.

The air conditioning unit 500 cools cold water through refrigerant. Cooled cold water absorbs heat of air in the air conditioning unit 500 to allow indoor cooling. The air conditioning unit 500 includes a cold water discharge pipe 520 in communication with the cold water inlet tube 421 and a cold water inlet pipe 510 in communication with the cold water discharge tube 422. Refrigerant that has completed heat exchange in the evaporator 400 is introduced into the compressor 100 through the compressor connection passage 460 again.

Figure 2:
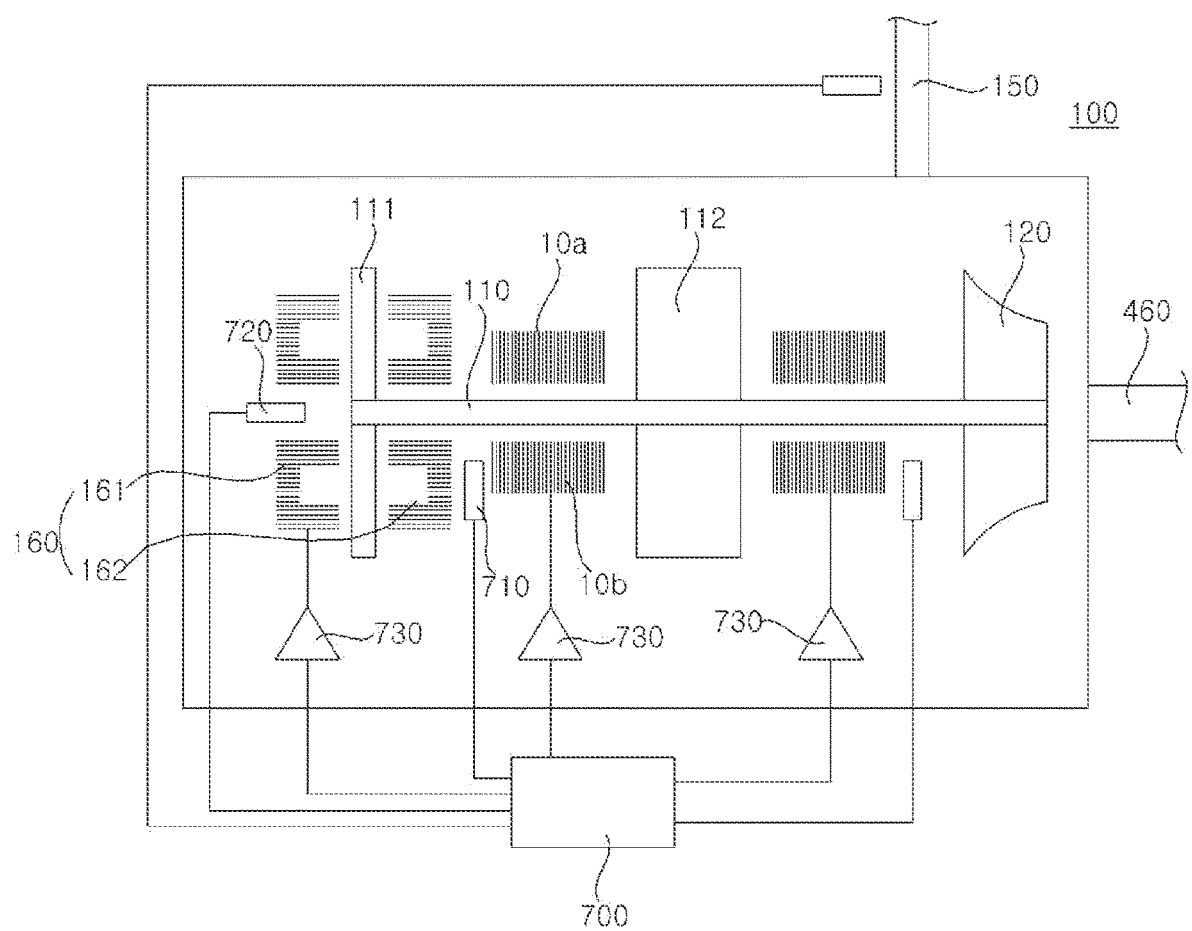
FIG. 2 is a view showing a structure of a compressor according to an embodiment of the present disclosure.

FIG. 2 is a view showing a compressor 100 (aka, a turbo compressor) according to an embodiment of the present disclosure.

The compressor 100 according to FIG. 2 includes at least one impeller 120 that sucks refrigerant in an axial direction Ax and compresses it in a centrifugal direction, a rotation shaft 110 to which the impeller 120 and a motor 130 for rotating the impeller 120 are connected, a bearing unit 140 including a plurality of magnetic bearings 10 supporting the rotation shaft 110 so as to be rotatable in the air and a bearing housing 142 supporting the magnetic bearing 10, a gap sensor 70 that senses a distance from the rotation shaft 110 and a thrust bearing 160 that limits the rotation shaft 110 from vibrating in the axial direction Ax. In addition, the compressor 100 of the present disclosure may further include a vibration measurement sensor 72 that measures a vibration frequency of the discharge passage 150.

The impeller 120 is generally composed of one or two stages, and may be composed of a plurality of stages. The impeller 120 rotates by the rotation shaft 110 and serves to make the refrigerant high pressure by compressing the refrigerant introduced in the axial direction Ax by rotation in a centrifugal direction.

The motor 130 may have a separate rotation shaft different from the rotation shaft 110 and may have a structure that transmits rotational force to the rotation shaft 110 by a belt (not shown), but in the case of an embodiment of the present disclosure the motor 130 is composed of a stator (not shown) and a rotor 112, and rotates the rotation shaft 110.

The rotation shaft 110 is connected to the impeller 120 and the motor 13. The rotation shaft 110 extends in a left-right direction of FIG. 2. Hereinafter, the axial direction Ax of the rotation shaft 110 means the left-right direction. It is preferable that the rotation shaft 110 includes a metal so as to be movable by the magnetic force of the magnetic bearing 10 and a thrust bearing 160.

In order to prevent vibration in the axial direction Ax (the left-right direction) by the thrust bearing 160, it is preferable that the rotation shaft 110 has a certain area in a plane perpendicular to the axial direction Ax. Specifically, the rotation shaft 110 may further include a rotation shaft blade 111 that provides sufficient magnetic force to move the rotation shaft 110 by the magnetic force of the thrust bearing 160. The rotation shaft blade 111 may have an area larger than a cross-sectional area of the rotation shaft 110 in a plane perpendicular to the axial direction Ax. The rotation shaft blade 111 may be formed to extend in a radial direction of the rotation shaft 110.

The thrust bearing 160 are composed of a conductor and have a coil wound thereon. The thrust bearing 160 serve as a magnet by current flowing through the coil wound thereon. The thrust bearing 160 is provided to be adjacent to the rotation shaft blade 111 provided to extend in a rotational radial direction of the rotation shaft 110.

The magnetic bearing 10 supports the rotation shaft 110 in the radial direction crossing the axial direction of the rotation shaft 110. The magnetic bearing 10 supports the rotation shaft 110 in the radial direction crossing the axial direction of the rotation shaft 110. The magnetic bearing 10 is composed of a conductor and have a coil wound thereon. The magnetic bearing 10 serve as a magnet by current flowing through the coil wound thereon.

The magnetic bearing 10 allows the rotation shaft 110 to rotate without friction in a state in which the rotation shaft 110 floating in the air. For this, at least three coils should be provided with the rotation shaft 110 as the center, and each coil should be installed so as to be balanced about the rotation shaft 110 as the center.

The rotation shaft 110 is floated in the air by magnetic force generated by each coil. As the rotation shaft 110 is floated in the air and rotates, energy lost due to friction is reduced unlike a conventional disclosure having a bearing.

Meanwhile, the compressor 100 may further include a bearing housing 142 supporting the magnetic bearing 10.

Looking at a refrigerant flow, refrigerant introduced into the compressor 100 through the compressor connection passage 460 is compressed in the circumferential direction by an action of the impeller 120 and then discharged to the discharge passage 150. The compressor connection passage 460 is connected to the compressor 100 so that the refrigerant is introduced in a direction perpendicular to the rotation direction of the impeller 120.

The thrust bearing 160 limits the movement of the rotation shaft 110 due to vibration in the axial direction Ax and prevents the rotation shaft 110 from colliding with other components of the compressor 100 while moving in a direction of the impeller 120 when a surge occurs.

Specifically, the thrust bearing 160 is composed of a first thrust bearing 161 and a second thrust bearing 162, and is disposed so as to surround the rotation shaft blade 111 in the axial direction Ax of the rotation shaft 110. That is, in the axial direction Ax of the rotation shaft 110, the first thrust bearing 161, the rotation shaft blade 111, and the second thrust bearing 162 are disposed in this order.

More specifically, the second thrust bearing 162 is positioned closer to the impeller 120 than the first thrust bearing 161, the first thrust bearing 161 is positioned farther from the impeller 120 than the second thrust bearing 162, and at least a part of the rotation shaft 110 is positioned between the first thrust bearing 161 and the second thrust bearing 162. Preferably, the rotation shaft blade 111 is positioned between the first thrust bearing 161 and the second thrust bearing 162.

Therefore, the first thrust bearing 161 and the second thrust bearing 162 have an effect of minimizing the vibration of the rotation shaft 110 in the direction of the rotation shaft 110 due to the rotation shaft blade 111 with a large area and the action of magnetic force.

The gap sensor 70 measures the movement of the rotation shaft 110 in the axial direction Ax (the left-right direction). Of course, the gap sensor 70 may measure the movement of the rotation shaft 110 in an up-down direction (a direction orthogonal to the axial direction Ax). Of course, the gap sensor 70 may include a plurality of gap sensors 70.

For example, the gap sensor 70 is composed of a first gap sensor 710 that measures the vertical movement of the rotation shaft 110 and a second gap sensor 720 that measures the horizontal movement of the rotation shaft 110. The second gap sensor 720 may be disposed to be spaced apart from one end of the rotation shaft 110 in the axial direction Ax.

The discharge passage 150 discharges the refrigerant compressed by the impeller 120. The vibration measurement sensor 72 measures a vibration frequency of the discharge passage 150 and provides a vibration frequency value to a control unit 700 or a storage unit 740. The vibration measurement sensor 72 may be installed adjacent to the discharge passage 150. The vibration measurement sensor 72 measures the vibration of the discharge passage 150 using an accelerometer or measures the vibration of the discharge passage 150 using various other methods.

In the present disclosure, when the surge occurs, damage is already applied to the compressor 100, so that the surge of the compressor 100 is identified in advance before an occurrence of the surge, and the surge is prevented at a stage before the surge occurs.

When the frequency of the discharge passage 150 is sensed, measurement is more advantageous than that of detecting a vibration of the rotation shaft 110, and additional installation of equipment is convenient.

Figure 3:
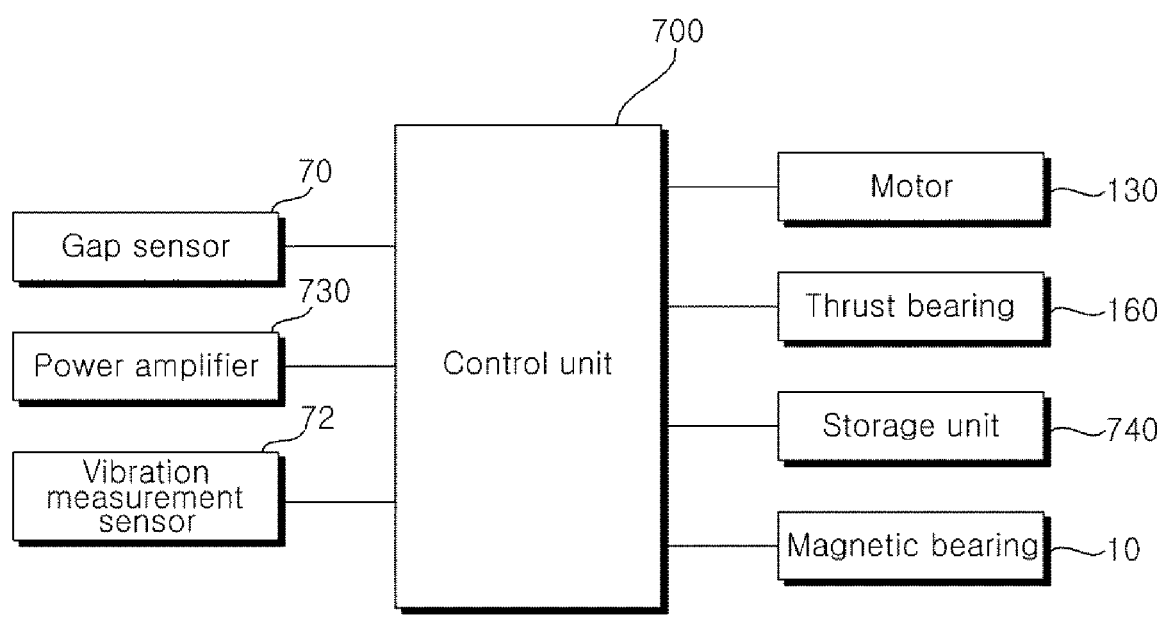
FIG. 3 is a block diagram showing a relationship between components connected to a control unit.

Referring to FIG. 3, the present disclosure may further include the control unit 700 that performs a surge avoidance operation based on the vibration frequency measured by the vibration measurement sensor 72.

The control unit 700 controls a power amplifier 730 that amplifies the magnitude of the current applied to the gap sensor 70, the magnetic bearing 141, motor 130 and the thrust bearing 160.

It is possible to adjust the magnitude of the current applied to the magnetic bearing 10, motor 130 and thrust bearing 160 by controlling the power amplifier 730 and to grasp the change in the position of the rotation shaft 110 according to the change in the magnitude of the current by using the gap sensor 70.

The value measured by the gap sensor 70 is stored in a storage unit 740. Data such as the reference position C0, the normal position range (−C1~+C1), and the eccentric position may be previously stored in the storage unit 740. When determining the surge occurrence condition in the future, it is possible to determine whether to perform a surge avoidance operation by comparing the measured value and the value stored in the storage unit 740 with each other.

Specifically, when it is determined that the vibration frequency is out of a normal vibration frequency range, the control unit 700 executes the surge avoidance operation.

The surge generated by the compressor 100 is mostly caused by rotation stall caused by a growth of flow separation. Magnetic bearing controls a position of the rotation shaft, so it can swing the rotation shaft for a short time that do not affect a system, and if the flow separation can be managed before the rotation stall occurs in a manner that controls the number of revolutions of the compressor 100, inverter products can be operated while avoiding surges.

Since the flow separation grows in a direction of blocking a refrigerant flow path, analyzing a vibration component of the discharge passage 150 can confirm whether the flow separation grows due to a change in a BPF (Blade Passing Frequency) value. The present disclosure avoids the surge by observing the growth of the flow separation and shaking off the flow separation through control. The BPF may be defined as a product of the number of blade blades and a current operation frequency of the motor 130.

Here, the normal vibration frequency may be an experimentally determined value. For example, when the vibration frequency of the discharge passage 150 is lower than the BPF value, the control unit 700 may determine that it is out of the normal vibration frequency range. Another example, when a state where the vibration frequency of the discharge passage 150 is lower than the BPF value continues for a predetermined period of time, the control unit 700 may determine that the normal vibration frequency range is out.

Hereinafter, a normal operation of the compressor 100 will be described.

Figure 4:
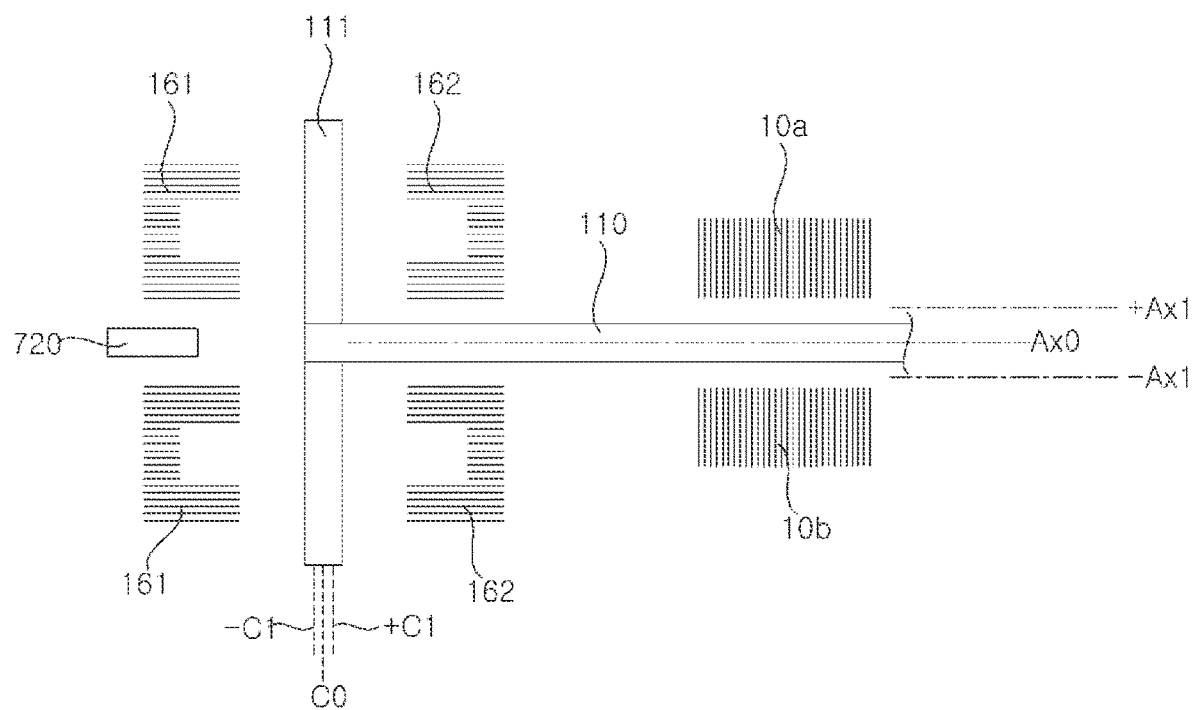
FIG. 4 is a view showing a case in which a compressor according to an embodiment of the present disclosure operates normally.

FIG. 4 shows a case in which the compressor 100 according to an embodiment of the present disclosure is in normal operation.

Referring to FIG. 4, during normal operation, the control unit 700 maintains the operation frequency of the motor 130 at the normal frequency and controls the rotation shaft 110 to be within the normal position range. Specifically, the control unit 700 controls the magnetic bearing 10 to control a radial position of the rotation shaft 110 and controls the thrust bearing 160 to control an axial position Ax of the rotation shaft 110.

Figure 5A:
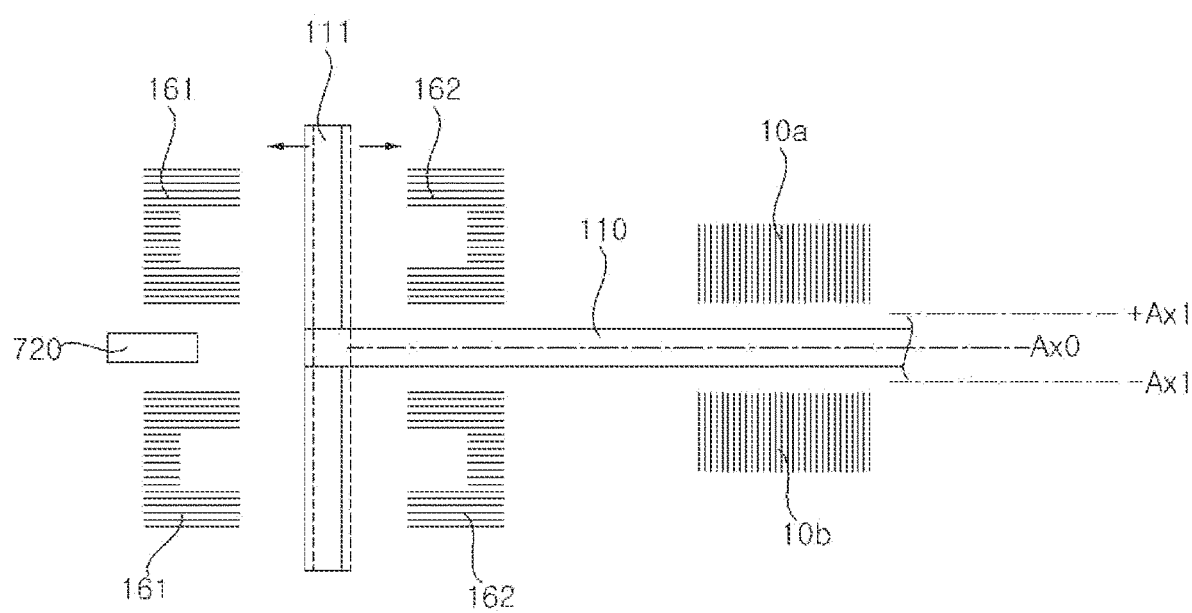
FIG. 5A is a view showing an example of a surge avoidance operation of a compressor.

Hereinafter, an example of the surge avoidance operation of the compressor 100 will be described with reference to FIG. 5A.

When it is determined that the vibration frequency is out of the normal vibration frequency range, the control unit 700 performs the surge avoidance operation.

For example, the surge avoidance operation is to vibrate the rotation shaft 110 of the compressor 100 in the axial direction for a predetermined number of times.

When it is determined that the vibration frequency is cut of the normal vibration frequency range, the control unit 700 controls the two thrust bearings 160 to vibrate the rotation shaft 110 in the axial direction a predetermined number of times.

Specifically, when it is determined that the vibration frequency is out of the normal vibration frequency range, the control unit 700 may change current supplied to the first thrust bearing 161 and current supplied to the second thrust bearing 162 by a predetermined number of times.

Here, the current supplied to the first thrust bearing 161 and the current supplied to the second thrust bearing 162 may be randomly changed by a predetermined number of times.

Of course, the control unit 700 may detect the position in the axial direction of the rotation shaft 110 by information received from the vibration measurement sensor 72, and change the current supplied to the first thrust bearing 161 and the current supplied to the second thrust bearing 162 in order to vibrate the rotation shaft 110 at a predetermined frequency for a predetermined number of times in the axial direction.

More specifically, when it is determined that the vibration frequency is out of the normal vibration frequency range, the control unit 700 may repeat making a first current value supplied to the first thrust bearing 161 smaller than a second current value supplied to the second thrust bearing 162 and then making the first current value supplied to the first thrust bearing 161 larger than the second current value supplied to the second thrust bearing 162 for a predetermined number of times.

At this time, an operation range of the rotation shaft 110 is set to a range smaller than a limit range, and the rotation shaft 110 may vibrate within the normal position range (−C1 to +C1), or outside the normal position range (−C1 to +C1).

Figure 5B:
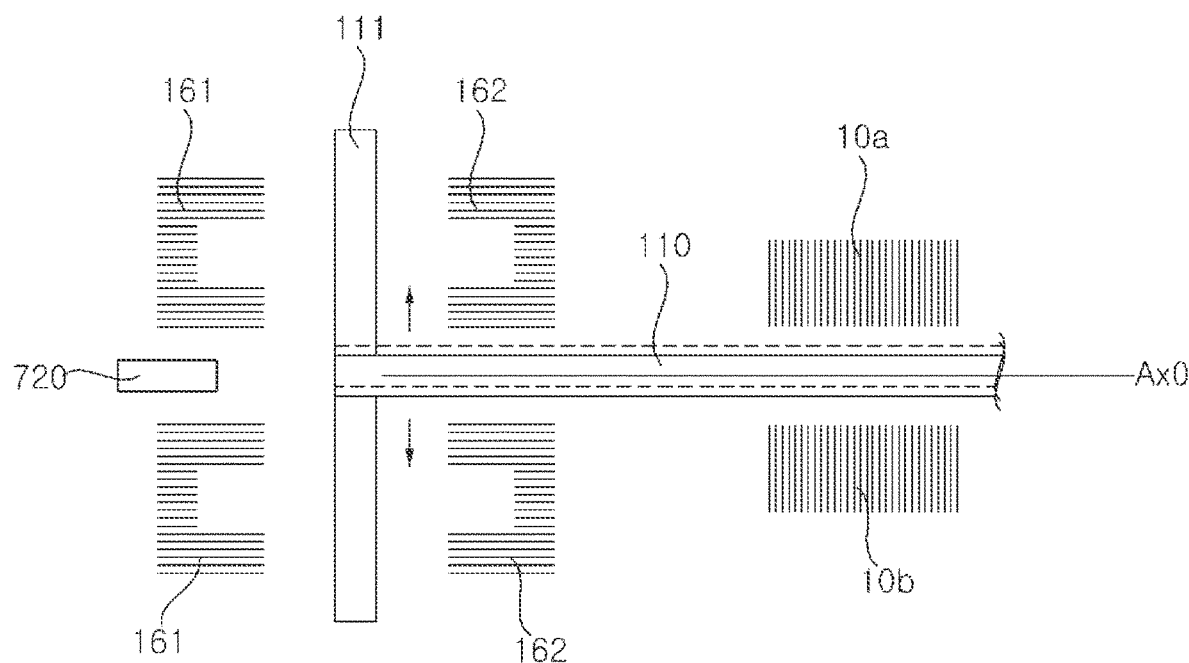
FIG. 5B is a view showing another example of a surge avoidance operation of a compressor.

Hereinafter, another example of the surge avoidance operation of the compressor 100 will be described with reference to FIG. 5B.

For example, the surge avoidance operation is to vibrate the rotation shaft 110 of the compressor 100 in the radial direction for a predetermined number of times.

When it is determined that the vibration frequency is out of the normal vibration frequency range, the control unit 700 controls the plurality of magnetic bearings 10 to vibrate the rotation shaft 110 in the radial direction a predetermined number of times.

Specifically, when it is determined that the vibration frequency is out of the normal vibration frequency range, the control unit 700 may change the current supplied to each of the magnetic bearings 10 by a predetermined number of times.

Here, the currents supplied to each magnetic bearing 10 are different from each other and may be randomly changed by a predetermined number of times.

Of course, the control unit 700 may detect the position in the radial direction of the rotation shaft 110 by information received from the vibration measurement sensor 72, and change the current supplied to the plurality of magnetic bearings 10 in order to vibrate the rotation shaft 110 at a predetermined frequency for a predetermined number of times in the radial direction.

In the present disclosure, the plurality of magnetic bearings 10 are disposed along a circumferential direction, a magnetic bearing 10 disposed above the rotation shaft 110 may be defined as a first magnetic bearing 10a, and a magnetic bearing 10 disposed below the rotation shaft 110 may be defined as the second magnetic bearing 10b based on FIG. 5B.

More specifically, when it is determined that the vibration frequency is out of the normal vibration frequency range, the control unit 700 may repeat making a third current value supplied to the first magnetic bearing 10a smaller than a fourth current value supplied to the second magnetic bearing 10b and then making the third current value supplied to the first magnetic bearing 10a larger than the fourth current value supplied to the second magnetic bearing 10b for a predetermined number of times.

At this time, the operation range of the rotation shaft 110 is set to a range smaller than the limit range, and the rotation shaft 110 may vibrate within the normal position range (−Ax1 to +Ax1), or outside the normal position range (−Ax1 to +Ax1).

Hereinafter, a structure of the magnetic bearing 10 that allows the rotation shaft 110 to rotate without friction while being suspended in the air will be described in detail.

Figure 6:
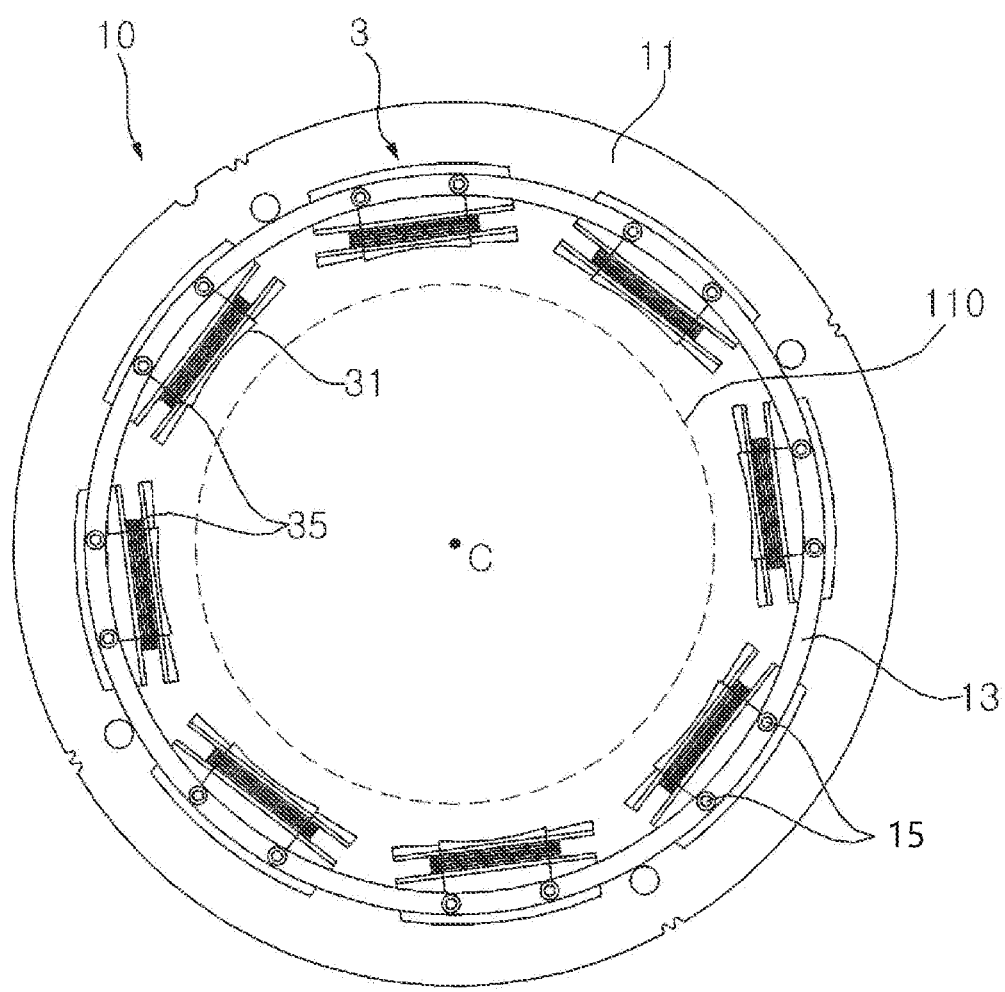
FIG. 6 is a view showing a configuration of a magnetic bearing of FIG. 2.
Figure 7:
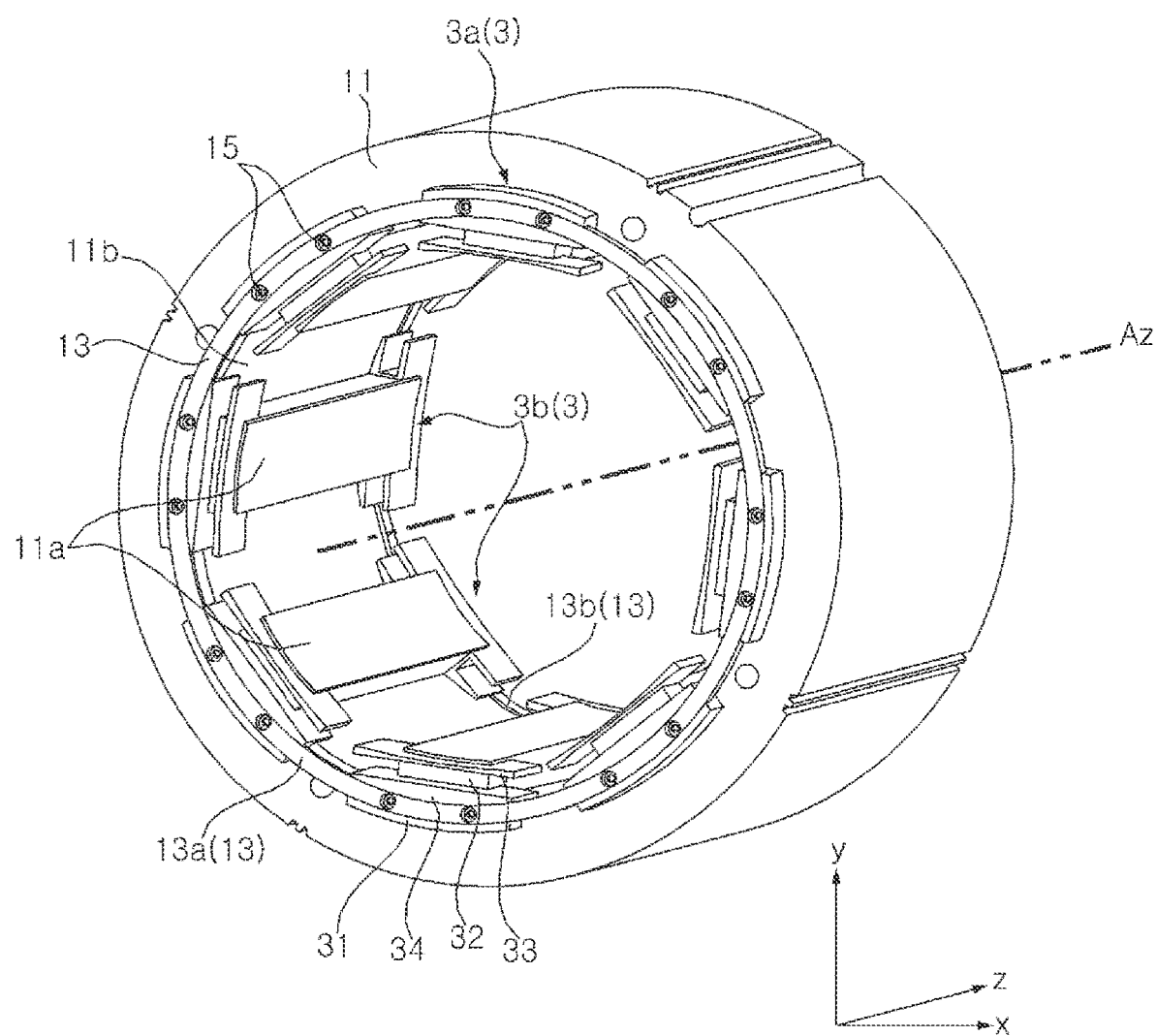
FIG. 7 is a perspective view of a magnetic bearing of FIG. 6 as viewed from a different direction except for a coil.
Figure 8:
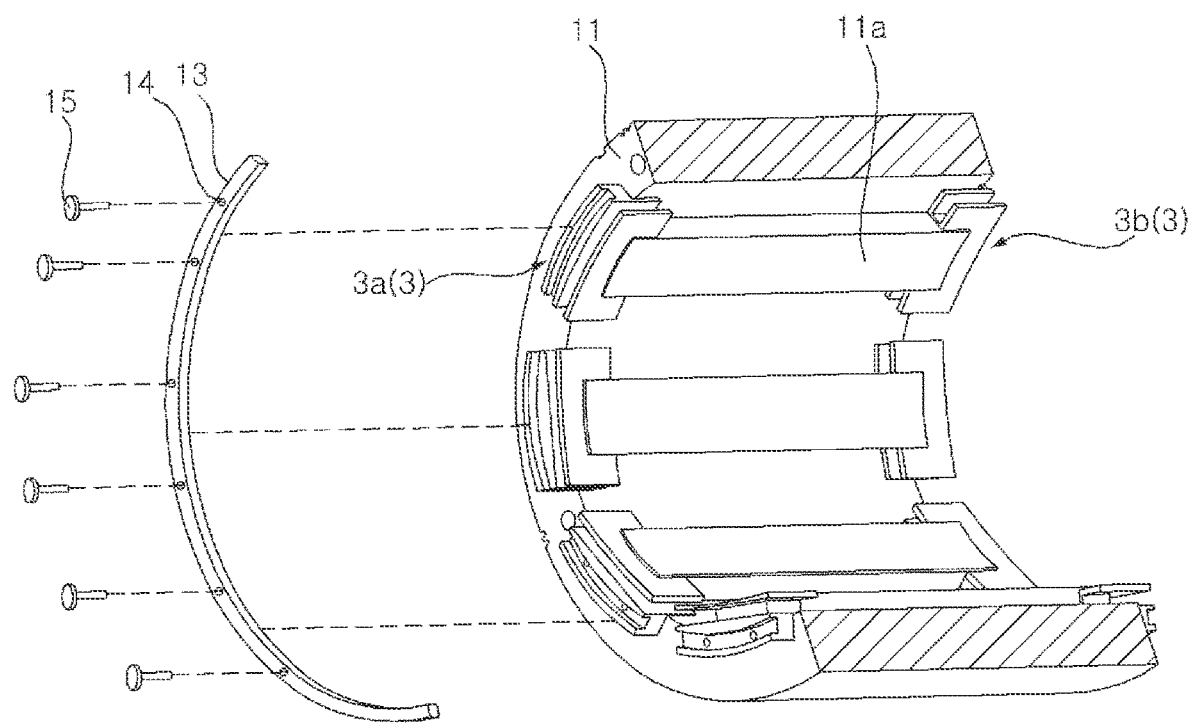
FIG. 8 is a cross-sectional view of a magnetic bearing of FIG. 7.
Figure 9:
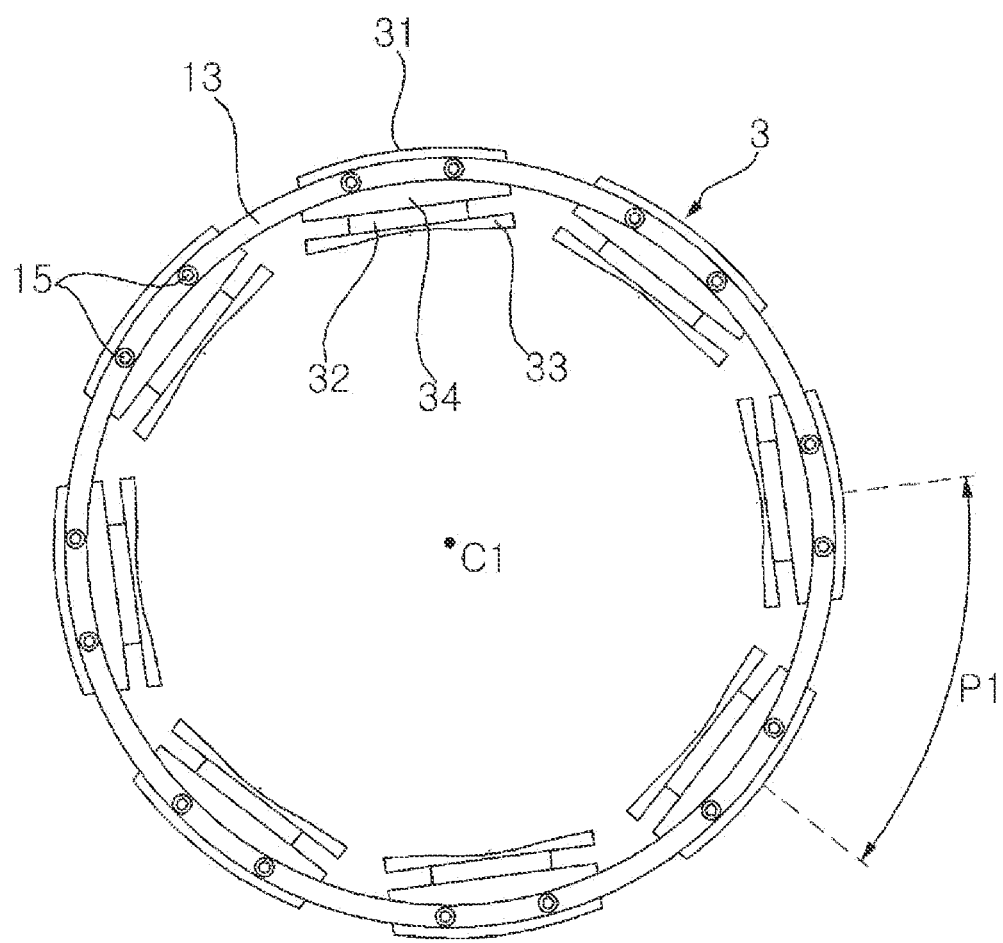
FIG. 9 is a view showing a combination of a bobbin and a crisis determination member of the present disclosure.

Referring FIGS. 6 and 7, the magnetic bearing 10 supports the rotation shaft 110 in the radial direction intersecting the axial direction Ax0 of the rotation shaft 110. The magnetic bearing 10 allows the rotation shaft 110 to rotate without friction while being suspended in the air. To this end, the magnetic bearing 10 should be provided with at least three or more coil parts around the rotation shaft 110, and each coil part should be installed in a balanced manner around the rotation shaft 110.

A positioning member 13 is provided to improve a concentricity of the plurality of coil parts of the present disclosure.

For example, the present disclosure includes a stator core 11 disposed to surround a central axis Ax, a plurality of bobbins 3 coupled to the stator core 11, a coil 35 wound around the bobbin 3, and the positioning member 13 coupled to the plurality of bobbins 3 to determine positions of the plurality of bobbins 3.

Here, the bobbin 3 and the coil 35 may be collectively referred to as the coil part.

The stator core 11 is disposed to surround the central axis Ax. The above-described rotation shaft 110 is positioned inside the stator core 11 and to be spaced apart from the stator core 11. The stator core 11 has a ring shape surrounding the rotation shaft 110.

The stator core 11 may be coupled to the bearing housing 142. As another example, the stator core 11 itself may serve as a bearing housing.

The stator core 11 is formed of a laminated silicon steel sheet. A plurality of teeth 11a are formed in the stator core 11. The plurality of teeth 11a are formed to protrude from an inner circumferential surface 11b of the stator core 11 toward a center C of the stator core 11 (the center of the rotation shaft 110).

The plurality of teeth 11a are disposed at a constant pitch in the circumferential direction. Specifically, it is preferable that the plurality of teeth 11a are installed with eight at a phase angle of 2α and 90°−2α. The teeth 11a has a rectangular cross section (a cross section cut along a X-Y plane).

Here, a direction describing the present disclosure is based on FIG. 7, the axial direction is a Z-axis direction, and a plane orthogonal to the axial direction is the X-Y-axis plane. In the Z-axis of FIG. 7, a direction toward a front is defined as a front direction, and a direction opposite to the front direction is defined as a rear direction.

And the coil part is attached to each of these teeth 11a respectively. In addition, each tooth 11a forms a part of the inner circumferential surface 11b of the stator core 11. Each tooth 11a may have a structure in which the coil unit is coupled. For example, a structure to be fitted with the bobbin 3 of the coil part may be formed at both front and rear ends of each tooth 11a.

Each tooth 11a extends in the front-rear direction, and a length in the front-rear direction is longer than a length in the circumferential direction of each tooth 11a.

Figure 10:
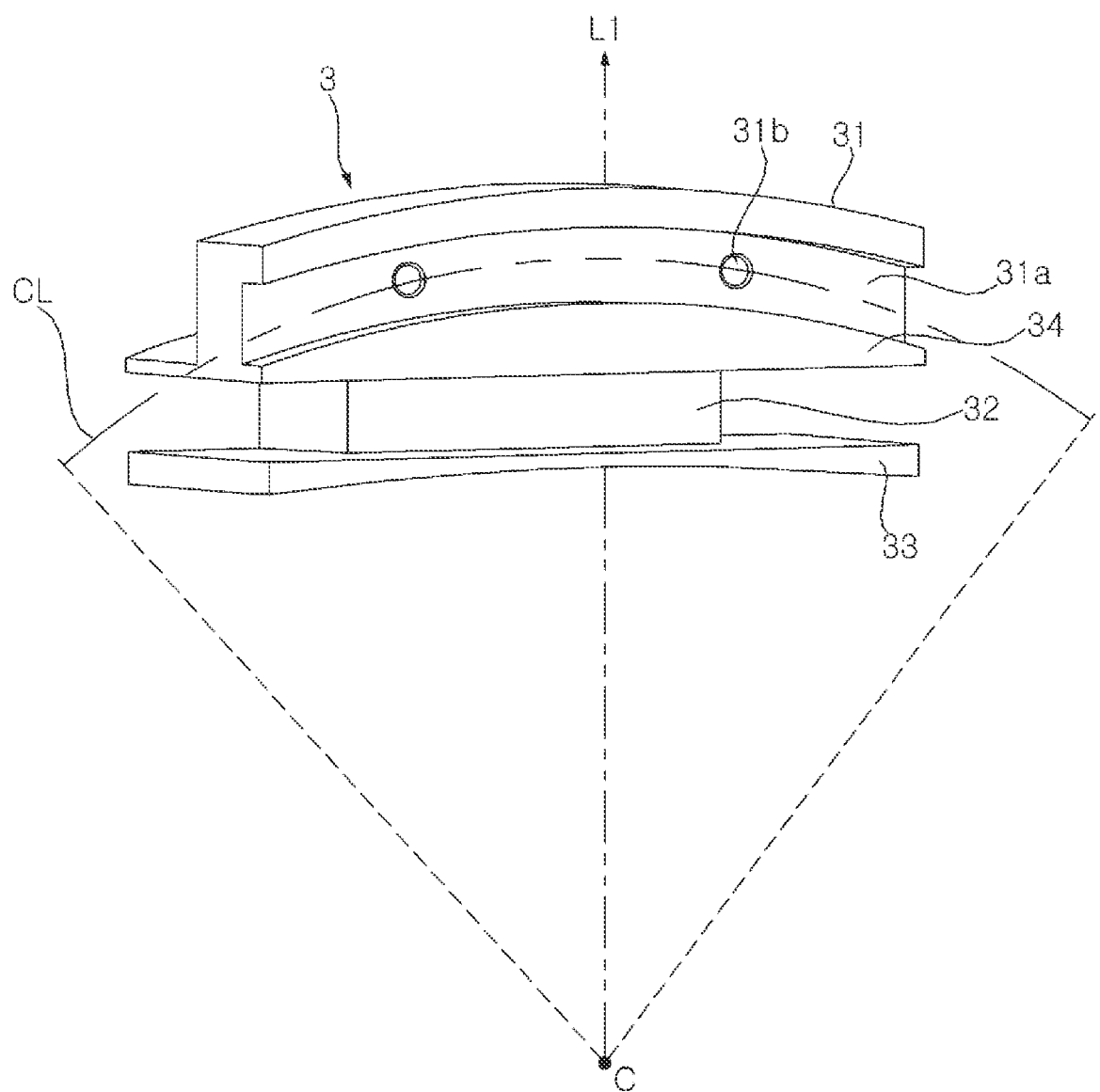
FIG. 10 is a perspective view of a bobbin of FIG. 6 as viewed from one side.
Figure 11:
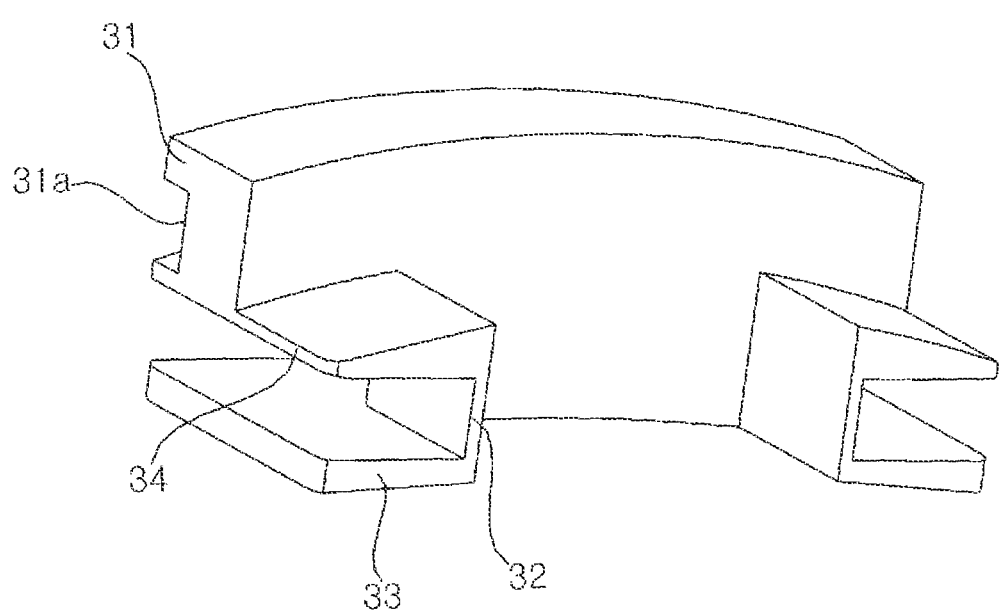
FIG. 11 is a perspective view of a bobbin as viewed from a different direction from FIG. 10.

Referring to FIGS. 6, 10, and 11, the coil part includes the bobbin 3 and the coil 35 wound around the bobbin 3 a plurality of times. Each coil part is coupled to both ends of each tooth 11a in the front-rear direction.

The bobbin 3 is coupled to the stator core 11. The bobbin 3 provides a space in which the coil 35 is wound. The bobbin 3 is made of an insulating material such as resin. The bobbin 3 includes a holder 31 including coil coupling part 32, 33 and 34 in which the coil 35 is wound, a coupling groove 31a into which the positioning member 13 is inserted, and a fastening groove 31b formed in the coupling groove 31a and to which a fastening member 15 is fastened.

The coil coupling part 32, 33, and 34 provide a space in which the coil 35 is wound and fix a position of the coil 35 in a state where the coil 35 is wound. The coil coupling part 32, 33, and 34 may have a structure in which a width of a central portion is smaller than a width of both ends, so that the coil 35 is wound around the central portion.

For example, the coil coupling part 32, 33, and 34 may include a body 32 on which the coil 35 is wound, a first flange 33 connected to one end of the body 32 in a thickness direction L1 and having a larger width than the body 32, and a second flange 34 connected to the other end of the body 32 in the thickness direction L1 and having a larger width than the body 32.

The first flange 33 and the second flange 34 may extend in a direction orthogonal to the thickness direction L1 of the body 32. The coil 35 is wound around the body 32, and the first flange 33 and the second flange 34 fix the position of the coil 35.

The coil coupling part 32, 33, and 34 may have a structure that matches one end of the tooth 11a. For example, some regions of the coil coupling part 32, 33, and 34 may protrude in one direction, and some other regions of the coil coupling part 32, 33, and 34 may be recessed in one direction.

The holder 31 fixes the positioning member 13 and provides a space in which the positioning member 13 is positioned. A position of each bobbin 3, a phase angle of each bobbin 3 and a direction pointing to the thickness direction (L1) of the body 32 of each bobbin 3 is aligned naturally by the shape of the holder 31 and the shape of the positioning member 13.

Therefore, in order to improve the concentricity of each bobbin 3, a separate measurement is not required, the concentricity is improved, and the position of each bobbin 3 is firmly fixed.

The holder 31 includes a coupling groove 31a into which the positioning member 13 is inserted and a fastening groove 31b formed in the coupling groove 31a and to which the fastening member 15 is fastened.

Some regions of the positioning member 13 is inserted into the coupling groove 31a. The coupling groove 31a may form an arc CL based on an arbitrary center point C1. The arbitrary central point C1 of the coupling groove 31a may coincide with the central axis Ax of the stator core 11 and a central point C of the positioning member 13.

A radius of the arc CL formed by the coupling groove 31a may be the same as a radius of the positioning member 13. Therefore, when the positioning member 13 is inserted into the coupling groove 31a by the shape of the coupling groove 31*a* and the shape of the positioning member 13, the bobbin 3 is facing the central axis Ax of the stator core 11.

The coupling groove 31*a* is formed by being recessed in a direction perpendicular to a plane of the arc formed by the coupling groove 31*a*. The coupling groove 31*a* is formed by a part of the holder 31 is recessed from the front to the rear or from the rear to the front.

The fastening groove 31*b* is formed in the coupling groove 31*a* so that the fastening member 15 penetrating the positioning member 13 is fastened. At least one fastening groove 31*b* may be formed.

The holder 31 is connected to the second flange 34, and the holder 31 may be positioned farther from the central axis Ax than the coil coupling part 32, 33, and 34. Accordingly, the positioning member 13 coupled to the holder 31 is disposed outward from the central axis Ax than the coil 35, so that the magnetic force of the coil 35 is not affected.

Separation distances of the plurality of bobbins from the central axis Ax 3 are equal to each other by the positioning member 13 coupled to the holder 31. Separation distances between the bobbins 3 adjacent to each other are constant.

Specifically, the plurality of bobbins 3 are arranged at a constant pitch in the circumferential direction. Specifically, it is preferable that eight bobbins 3 are installed at a phase angle of 2α and 90°−2α.

An extension line of the body 32 in the thickness direction L1 meets the central point C of the positioning member 13 and the central axis Ax of the stator core 11. Therefore, since the bobbin 3 is aligned in the direction of the central axis Ax of the stator core 11, it is possible to apply equal magnetic force in the same direction in all the coils 35.

The bobbin 3 includes a plurality of first bobbins 3*a* coupled to a front end of each tooth 11*a* and a plurality of second bobbins 3*b* coupled to a rear end of each tooth 11*a*.

The positioning member 13 is used to align the positions of the plurality of bobbins 3. The positioning member 13 is coupled to the plurality of bobbins 3 to determine the positions of the plurality of bobbins 3.

The positioning member 13 has a circular shape centered on the central point C. As described above, the radius of the positioning member 13 is the same as the radius of the arc formed by the coupling groove 31*a*. The central, point C of the positioning member 13 is positioned on the central axis Ax of the stator core 11.

Each bobbin 3 is disposed along a circumferential direction of the positioning member 13, The positioning member 13 has a ring shape having a certain thickness, and the positioning member 13 is inserted into the coupling groove 31*a* and the body 32 of each bobbin 3 is aligned toward the central point.

The positioning member 13 is formed with a plurality of coupling holes 14 through which the fastening member 15 passes. A position on the circumference of each bobbin 3 is determined by the coupling hole 14. The coupling hole 14 may be formed to correspond to the fastening groove 31*b*. The number of coupling holes 14 is not limited. Two of the plurality of coupling holes 14 form a set, and it is preferable that a pitch P1 between adjacent sets is constant.

When the two coupling holes 14 are formed, a spacing between them is the same as a spacing between the two fastening grooves 31*b* formed in each bobbin 3.

The positioning member 13 includes a first positioning member 13*a* coupled to the plurality of first bobbins 3*a* and a second positioning member 13*b* coupled to a plurality of second bobbins 3*b*. The first positioning member 13*a* is positioned in front of the stator core 11, and the second positioning member 13*b* is positioned behind the stator core 11.

Therefore, when assembling the positioning member 13, it does not interfere with other coils 35 etc., and is coupled from the outside of the stator core 11 so that the coupling is easy, there is little influence on other components, and there is less influence on magnetic field formation.

The magnetic bearing and compressor according to the present disclosure have the following effects.

According to at least one of the embodiments of the present disclosure, since a bobbin is coupled to both ends of a stator core, a volume of the bobbin can be minimized, and the volume of the bobbin is reduced to secure a winding space of a coil, and a winding of the coil is easy, and an output is superior compared to magnetic bearings of the same size.

According to at least one of the embodiments of the present disclosure, since a plurality of bobbins and coils are disposed on a circumference having the same radius at the same spacing and the same phase angle, a concentricity of each bobbin and coil is improved, and a control accuracy of magnetic bearing is improved.

According to at least one of the embodiments of the present disclosure, since a ring-shaped positioning member is coupled to an arc-shaped groove formed on a bobbin, and the bobbin is naturally arranged toward a central axis by their shape, concentricity can be maintained with a simple structure, and concentricity does not increase during operation of the magnetic bearing.

According to at least one of the embodiments of the present disclosure, by controlling the magnetic bearing, a position of the rotation shaft is moved in advance before an occurrence of a surge, so that the surge can be prevented before the occurrence of the surge.

The above described features, configurations, effects, and the like are included in at least one of the embodiments of the present disclosure, and should not be limited to only one embodiment. In addition, the features, configurations, effects, and the like as illustrated in each embodiment may be implemented with regard to other embodiments as they are combined with one another or modified by those skilled in the art. Thus, content related to these combinations and modifications should be construed as including in the scope and spirit of the disclosure as disclosed in the accompanying claims.

What is claimed is:

1. A magnetic bearing comprising:
   a stator core disposed to surround a central axis;
   a plurality of bobbins coupled to the stator core;
   a coil wound around each of the plurality of bobbins; and
   a positioning member coupled to the plurality of bobbins via a plurality of fasteners and determining positions of the plurality of bobbins,
   wherein the positioning member has a circular shape centered on a central point,
   wherein the positioning member comprises a plurality of coupling holes extending through an entire thickness of the positioning member, and
   wherein the plurality of fasteners extend through the plurality of coupling holes and are inserted by passing from an outer surface of the positioning member into the plurality of coupling holes.

2. The magnetic bearing of claim 1, wherein the central point of the positioning member is positioned on the central axis of the stator core.

3. The magnetic bearing of claim 1, further comprising a plurality of fastening members passing through the plurality of coupling holes to couple the positioning member to the plurality of bobbins.

4. The magnetic bearing of claim 3, wherein two of the plurality of coupling holes form a set, and a pitch between adjacent sets is constant.

5. The magnetic bearing of claim 1, wherein separation distances of the plurality of bobbins from the central axis are equal to each other.

6. The magnetic bearing of claim 1, wherein separation distances between the plurality of bobbins adjacent to each other are constant.

7. The magnetic bearing of claim 1, further comprising a plurality of teeth protruding toward a center of the stator core from an inner circumferential surface of the stator core,
wherein the plurality of bobbins comprise:
a plurality of first bobbins coupled to a front end of each of the teeth; and
a plurality of second bobbins coupled to a rear end of each tooth.

8. The magnetic bearing of claim 7, wherein the positioning member comprises:
a first positioning member coupled to the plurality of first bobbins; and
a second positioning member coupled to the plurality of second bobbins.

9. The magnetic bearing of claim 8, wherein the first positioning member is positioned in front of the stator core, and
wherein the second positioning member is positioned behind the stator core.

10. A magnetic bearing comprising:
a stator core disposed to surround a central axis;
a plurality of bobbins coupled to the stator core;
a coil wound around each of the plurality of bobbins; and
a positioning member coupled to the plurality of bobbins and determining positions of the plurality of bobbins,
wherein the positioning member has a circular shape centered on a central point, and
wherein each of the plurality of bobbins comprise:
a coil coupling part on which the coil is wound; and
a holder comprising a coupling groove into which the positioning member is inserted and a fastening groove formed in the coupling groove and to which a fastening member is fastened.

11. The magnetic bearing of claim 10, wherein each coupling groove forms an arc having a radius equal to a radius of the positioning member.

12. The magnetic bearing of claim 10,
wherein each coil coupling part comprises:
a body on which the coil is wound;
a first flange connected to one end of the body in a thickness direction and having a width greater than a width of the body; and
a second flange connected to the other end of the body in the thickness direction and having a width greater than the width of the body.

13. The magnetic bearing of claim 12, wherein for each of the plurality of bobbins, the holder is connected to the second flange.

14. The magnetic bearing of claim 12, wherein for each of the plurality of bobbins, the holder is positioned farther from the central axis than the coil coupling part.

15. The magnetic bearing of claim 12, wherein an extension line of the body in the thickness direction meets the central point.

16. A magnetic bearing comprising:
a stator core disposed to surround a central axis;
a plurality of bobbins coupled to the stator core;
a coil wound around the bobbin; and
a positioning member coupled to the plurality of bobbins and determining positions of the plurality of bobbins,
wherein each of the plurality of bobbins comprise a coupling groove into which the positioning member is inserted, and
wherein the coupling grooves have an arc-shape.

17. A compressor comprising:
one or more impellers for suctioning and compressing a refrigerant;
a motor rotating the impeller;
a rotation shaft to which the impeller and the motor are connected; and
a magnetic bearing supporting the rotation shaft in a radial direction crossing an axial direction of the rotation shaft,
wherein the magnetic bearing comprises:
a stator core disposed to surround a central axis;
a plurality of bobbins coupled to the stator core;
a coil wound around the bobbin; and
a positioning member coupled to the plurality of bobbins via a plurality of fasteners and determining positions of the plurality of bobbins,
wherein the positioning member comprises a plurality of coupling holes extending through an entire thickness of the positioning member,
wherein the positioning member has a circular shape centered on a central point, and
wherein the plurality of fasteners extend through the plurality of coupling holes and are inserted by passing from an outer surface of the positioning member into the plurality of coupling holes.

18. The compressor of claim 17, wherein the central point of the positioning member is positioned on a central axis of the stator core.

19. The compressor of claim 17,
wherein each of the plurality of bobbins comprise:
a coil coupling part on which the coil is wound; and
a holder comprising a coupling groove into which the positioning member is inserted and a fastening groove formed in the coupling groove and to which a fastening member is fastened.

20. The compressor of claim 19, wherein each coupling groove forms an arc having a radius equal to a radius of the positioning member.

* * * * *